US005814912A

United States Patent [19]

Ross

[11] Patent Number: 5,814,912

[45] Date of Patent: Sep. 29, 1998

[54] ELECTRICAL LEAD BUSHING FOR A TURBINE GENERATOR

[76] Inventor: Christopher Woodrow Ross, P.O. Box 1614, Goldenrod, Fla. 32733

[21] Appl. No.: 819,432

[22] Filed: Mar. 17, 1997

[51] Int. Cl.[6] .................... H02K 11/00

[52] U.S. Cl. .................... 310/71

[58] Field of Search .................... 310/71; 439/382, 439/383

[56] References Cited

U.S. PATENT DOCUMENTS

| | | | |
|---|---|---|---|
| 3,575,516 | 4/1971 | Lyon et al. | 310/71 |
| 3,821,561 | 6/1974 | Feser | 307/110 |
| 4,042,759 | 8/1977 | Cella | 439/801 |
| 4,052,631 | 10/1977 | Kuter | 310/71 |
| 4,188,515 | 2/1980 | Patel et al. | 439/252 |
| 4,473,714 | 9/1984 | Brownell et al. | 439/99 |
| 4,488,072 | 12/1984 | Archibald et al. | 310/71 |
| 4,495,260 | 1/1985 | Hardigg et al. | 429/180 |
| 4,800,311 | 1/1989 | Weldon et al. | 310/42 |
| 5,122,696 | 6/1992 | Shih et al. | 310/71 |
| 5,382,856 | 1/1995 | Keck et al. | 310/71 |
| 5,435,760 | 7/1995 | Miklos | 439/321 |

*Primary Examiner*—Clayton E. LaBalle
*Attorney, Agent, or Firm*—R. P. Lenart

[57] ABSTRACT

A main electrical lead of an electrical generator has an electrical conductor or main lead bushing which transmits electrical current produced by the generator to electrical loads external to the generator. The electrical conductor and the main electrical lead are electrically connected by a mechanical connector and a spring mechanism. The spring mechanism provides a force on the mechanical connector to maintain the conductor and the main lead in sufficient electrical contact so that they can transmit the requisite electrical current. A method of installing the spring mechanism is also provided and includes removing the electrical conductor from the main electrical lead and installing the spring mechanism under pressure betweeen the conductor and the main lead. The electrical conductor is then again mechanically connected to the main electrical lead.

17 Claims, 2 Drawing Sheets

ELECTRICAL LEAD BUSHING FOR A TURBINE GENERATOR

BACKGROUND OF THE INVENTION

This invention relates to main lead bushings of electrical turbine generators. Additionally, this invention relates to a method of electrically connecting a main lead of an electrical generator with an electrical conductor or main lead bushing that transmits electricity produced by the generator from the main lead to a component external to the generator.

Conventionally, electrical generators employ a plurality of main electrical leads and neutral electrical leads. The main electrical leads transmit electricity produced by the generator to electrical components outside of the generator. Typically, a generator has three main electrical leads. In order to transmit electricity from the main leads, an electrical conductor or main lead bushing is typically mechanically connected to each main lead. This electrical conductor transmits electricity from the main leads to external electrical components. As is discussed in detail below, the main leads typically are cylindrical in shape with threads running around the external circumference of the cylinder. In comparison, the electrical conductors generally take the shape of a flange. The flanges have a counterbored or hollowed out interior portion, the circumference of which is threaded. The threaded portion of one of the electrical conductors mates with the threaded portion of one of the main electrical leads. In addition to providing a mechanical connection, these threads also provide an electrical connection between the electrical conductor and the main electrical lead. In order to insure a sufficient mechanical and electrical connection between the threads, screws are also used to affix the electrical conductor to the main electrical lead. Typically, these screws are inserted through a top portion of the electrical conductor and extend into the top of the main electrical lead. These screws do not conduct electricity. Rather, they merely mechanically connect the main electrical lead to the electrical conductor.

This method of electrically connecting electrical conductors to main electrical leads has proven to have significant draw backs. Specifically, during operation of an electrical generator the threaded mechanical connection between the electrical lead and the electrical conductor has in some instances become loose. One cause of this may be vibrations of the machinery. If the threads become loose, the electrical resistance at the threads increases. As the electrical resistance increases and electrical current is transmitted through the components, additional heat is generated. Because these components typically transmit a relatively large amount of electrical current, the amount of heat that is generated by this increased resistance may be significant. In some instances, it may cause overheating and mechanical deformation of either the main lead or the electrical conductor. For example, the threads between the components can become overheated and melt. If this occurs, the components will not function at their capacity, nor will they transmit the requisite electrical current to components external to the generator.

This invention relates to a method and an apparatus for electrically connecting an electrical conductor and a main electrical lead of an electrical turbine generator to prevent the electrical connection between them from becoming loose during operation of the electrical generator.

SUMMARY OF THE INVENTION

The present invention includes an electrical generator that has a main electrical lead and a neutral electrical lead for transmitting electricity produced by the generator. Additionally, the generator has an electrical conductor in mechanical and electrical contact with the main electrical lead. A spring mechanism is also provided that exerts a force between the electrical conductor and the main electrical lead to maintain sufficient electrical contact between them. More specifically, the spring mechanism provides a force to push the main lead and the conductor together and thereby, prevent the electrical connection between them from becoming loose and increasing the electrical resistance.

In one embodiment of this invention, the main electrical lead is substantially cylindrical in shape and the electrical conductor takes the shape of a flange. Additionally, the electrical conductor has a hollowed out interior that is threaded around its circumference. This threaded section of the electrical conductor mates with a threaded section running around the circumference of the main electrical lead. In this embodiment, the spring mechanism exerts a force to ensure that the threads of the electrical conductor are in sufficient electrical contact with the threads of the electrical lead.

This invention also includes a method of preloading the electrical connection between the main electrical lead of an electrical generator and an electrical conductor. Included within this method is removing the electrical conductor from the main electrical lead and installing a spring mechanism under pressure to a hollowed out interior portion of the electrical conductor. After this spring mechanism has been installed, the electrical conductor is than placed in mechanical and electrical contact with the main electrical lead.

DETAILED DESCRIPTION OF THE PREFERRED EMBODIMENTS

Figure 1:
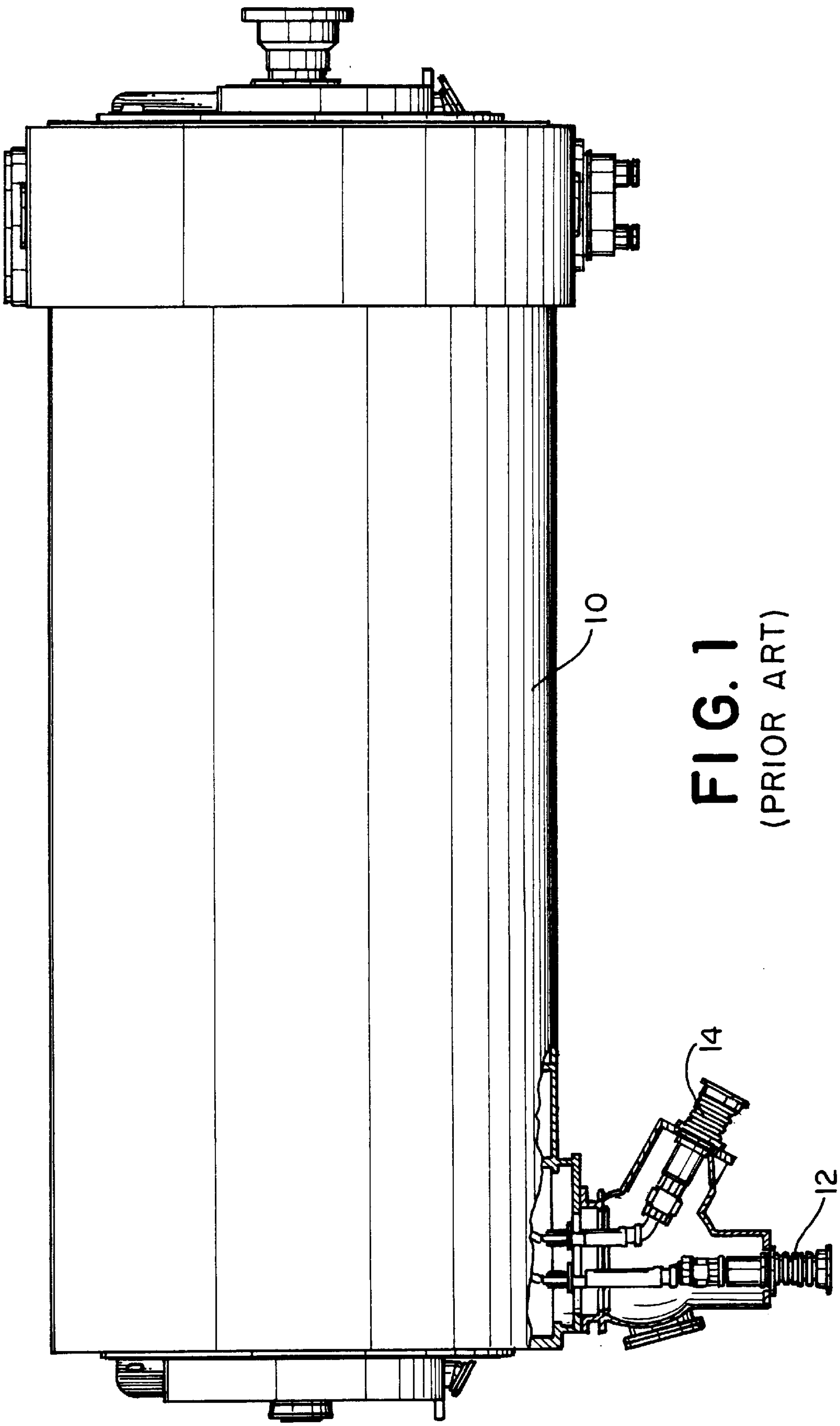
FIG. 1 (PRIOR ART)
FIG. 1, is a diagrammatical view of an electrical generator.

Referring now to the drawings, wherein like reference numerals designate corresponding structure through out the views, there is shown in FIG. 1 an electrical generator (10) that includes a main lead (12) and a neutral lead (14). As will be appreciated by those skilled in the art, an electrical generator (10) typically has a plurality of main leads (12) and at least one neutral lead (14). One of each of the leads (12, 14) is shown in FIG. 1 for purposes of simplicity. These leads (12, 14) operate in a conventional fashion to transmit electricity produced by the generator (10) through the main lead (12) to components outside of the generator (10).

Figure 2:
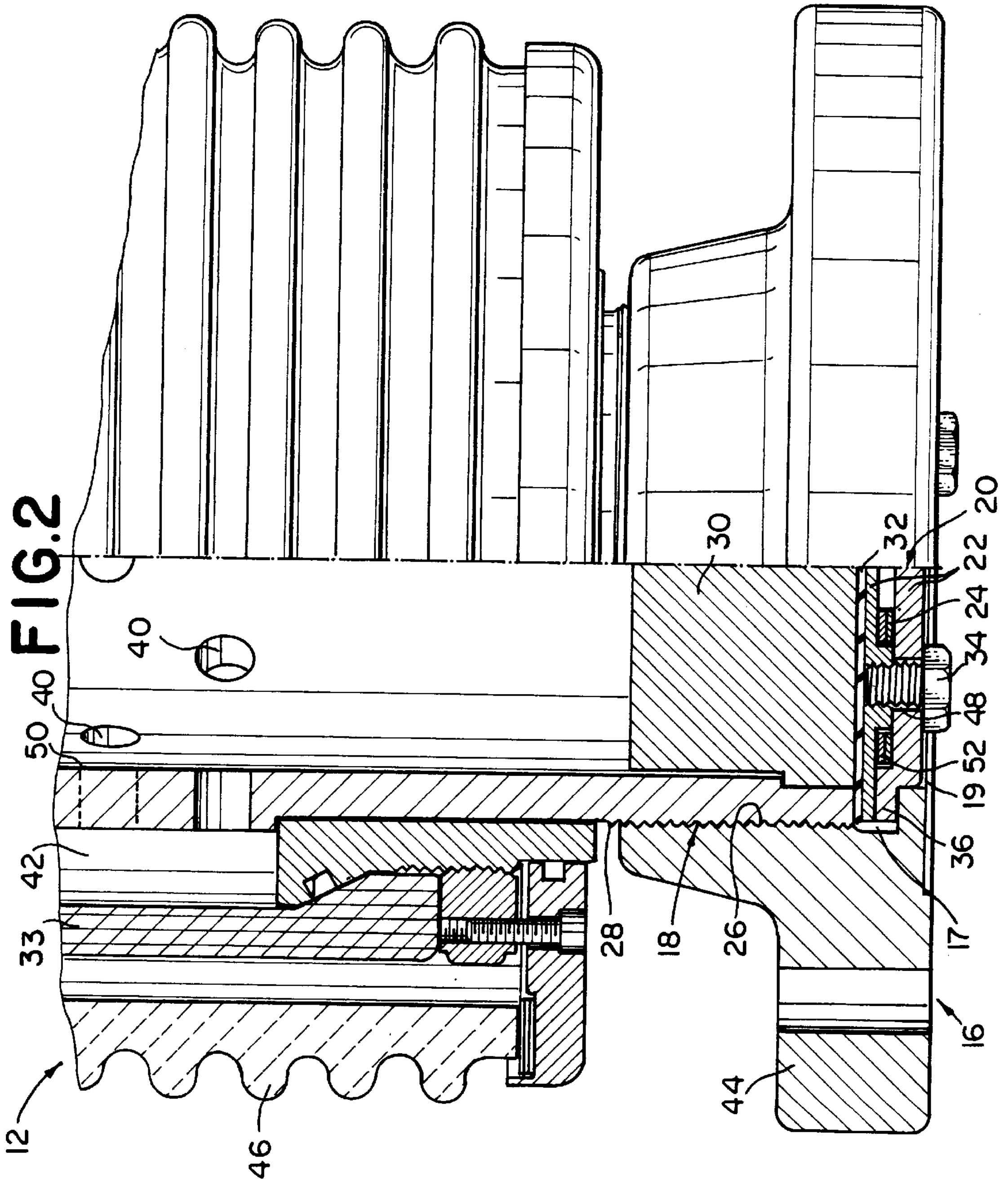
FIG. 2 is a partial cross-sectional view of a main electrical lead according to a preferred embodiment of this invention.

Shown in FIG. 2, is a main lead (12) mechanically and electrically connected to an electrical conductor (16), also known as a main lead bushing, according to a preferred embodiment of this invention. Although the prior art main electrical lead, is not shown it can be understood with reference to FIG. 2. As is conventional, the main electrical lead (12) is substantially cylindrical in shape and has an end plug (30) mounted on its external end. As is also typical, the electrical conductor (16) takes the shape of a flange, and is commonly referred to as the "air side terminal flange." Both the electrical conductor (16) and the main electrical lead (12) have a threaded portion. The threaded portion (28) of the main electrical lead (12) runs around a portion of its circumference. The threaded portion (26) of the electrical conductor (16) runs around the circumference of an interior (17) of the conductor (16) that is hollowed out. As is clearly depicted in FIG. 2, these threaded portions can be mated to provide a mechanical connection between the electrical conductor (16) and the main electrical lead (12). This threaded connection also provides the electrical point of contact between the electrical conductor (16) and the main electrical lead (12). Thus, as is typical, electricity produced by the generator (10) is transmitted through the main electrical lead (12), through its threads (26), into the threads (28) of the electrical conductor (16), and through the electrical conductor (16) to a component external to the generator (10).

Additionally, the main lead (12) is of the type that has hydrogen cooling or a similar cooling mechanism. As is illustrated in FIG. 2, the main lead (12) has an internal hollowed out conductive element (50) and a plurality of apertures (40) in this hollowed out conductive element (50). These apertures (40) connect the hollow conductive element (50) to a channel (42) running through the wall of the main lead (12). Hydrogen can be directed down through the hollowed out conductive element (50) of the main lead (12) through the apertures (40) and into the channel (42) to cool the main lead (12). Hydrogen cooling of main leads (12) is known in the art and the main lead (12) of this invention can employ such cooling. Because such cooling is conventional, the details of such a system are not illustrated.

Preferably, the main lead (12) and the end plug (30) are copper or another highly electrically conductive material. As is illustrated in FIG. 2, the main lead (12) is substantially cylindrical in shape and has a layer of insulation (33) running circumferentially around the hydrogen cooling channel (42). Additionally, the main lead (12) has a protective cover (46) over its exterior which is preferably porcelain.

As is shown in FIG. 2, the electrical conductor (16) may be shaped in the form of a flange and is preferably copper or another high electrically conductive material. Flanged shaped electrical conductors (16) are generally circular in shape and have an annular area (44) disposed on the exterior of the flange. This annular area (44) typically electrically connects the conductor (16) with power equipment (not shown) or other electrical loads. The flange (16) also has a hollowed out interior (17) of a diameter that enables the flange (16) to receive the main lead (12) into the interior (17). The interior (17) may have an inner face (19) and a threaded portion (26) that runs around its circumference and mates with the threaded portion (28) of the main lead (12).

FIG. 2 also depicts a screw (34) extending through the electrical conductor (16). Although only one screw is illustrated, typically a plurality of these screws (34) is employed. However, though not depicted in FIG. 2 but as is conventional in the prior art, these screws (34) extend from the electrical conductor (16) into the end plug (30). Since the end plug (30) is mounted to the main electrical lead (12), these screws (34) provide a mechanical connection between the electrical conductor (16) and the main electrical lead (12). As is discussed in detail below, the screws (34) do not extend into either the main lead (12) or the end plug (30) in the most preferred embodiment of this invention.

The generator (10), the main lead (12), the electrical conductor (16) and the features of each of them described above are prior art and can be incorporated into the invention detailed below. This prior art design described above has been proven to be inadequate. Due to vibrational forces during operations of the electrical generator (10), or for other reasons, the mechanical and electrical connections between the threaded portions (26, 28) of the main electrical lead (12) and the electrical conductor (16) can become loose. When this occurs the electrical resistance at the electrical connection increases. Do to the large amount of electrical current being transmitted through this connection, this increased electrical resistance causes a significant amount of heat to be generated at the point of electrical contact. The heat generated because of the increased electrical resistance can cause component damage, including melting or thermal damage to the threads (26, 28) of the main lead (12) or the electrical conductor (16) and/or thermal damage to other portions of these or other components.

In order to prevent the point of electrical contact from becoming loose during operations of the electrical generator (10) the present invention includes a spring mechanism (20) disposed between the electrical conductor (16) and the main electrical lead (12). Included within this spring mechanism (20) is at least one spring (24) and one or more spring plates (22) . In the most preferred embodiment of this invention illustrated in FIG. 2, two spring plates (22) are employed. Preferably, the spring plates (22) are constructed of stainless steel and have a plurality of threaded cavities (48) for receiving the screws (34). Although only one cavity (48) is illustrated in FIG. 2, it will be appreciated that the spring plates (22) have a plurality of cavities (48) disposed at about an equal radial distance from the center of the spring plates (22). As shown in FIG. 2, upon mating the spring plates (22) they form an opening (52) around the cavity (48) for receiving the springs (24). Again, although only one opening (52) is depicted, it will be appreciated that an opening (52) is formed around each cavity (48). Preferably, at least one spring (24) is inserted into each opening (52) and runs around the circumference of the corresponding cavity (48). The springs (24) are preferably conical in shape and may be Bellevile® brand washers or their equivalent.

In order to install the spring mechanism (20), the electrical conductor (16) is disassembled from the main electrical lead (12). This includes removing the screws (34), mentioned above, that extend through the electrical conductor (16) to the end plug (30) and unscrewing the threaded portion of the electrical conductor (16) from the main lead (12). After the electrical conductor (16) has been removed, a section of the interior (17) of the flange is further hollowed out and counterbored to create a recessed portion (36) for one of the spring plates (22). This recessed portion (36) can be created with a lathe or similar tooling device and may further include the step of polishing the interior (17).

One of the spring plates (22) is then installed against the inner face (19) of the electrical conductor (16), and the springs (24) are inserted into the openings (52) around each of the cavities (48) and against the installed spring plate (22). A second spring plate (22) is then inserted against the springs (24) and the recessed portion (36) A hydraulic jack (not shown as it is well understood by those skilled in the art) or a similar mechanism is than used to compress the spring plates (22) and the spring (24) against the electrical conductor (16). While still compressed under pressure, the screws (34) are installed in the flange (16) and the cavities (48) of the spring plates (22) and, thereby, mechanically connecting the spring plates to the electrical conductor (16). Preferably, the screws (34) are then torqued. The hydraulic jack or similar mechanism is then released.

As is shown in FIG. 2, the springs (24) run around the circumference of the cavities (48). Because the screws (34) are installed while the spring plates (22) and the spring (24) are compressed, as is discussed in detail below, they can now provide a follow-up or preload force should the electrical/mechanical connection between the electrical conductor (16) and the main lead (12) become loose during operation of the generator (10).

Insulation (32) is then placed between the lower spring plate (22) and the main lead (12). Afterwards, the electrical conductor (16) is then mated with the electrical lead (12) by screwing their respective threaded portions (26, 28) together.

As is shown in FIG. 2, the screw (34) does not extend into the main lead (12) in this preferred embodiment. Rather it merely connects the compressed spring plates (22) to the electrical conductor (16). After the conductor (16) and the lead (12) have been threaded together, the screws (34) can be removed. Upon their removal, the compressed springs (22) will expand and transmit a force to push the main lead (12) and the conductor (16) together at their threaded sections (26, 28).

With the spring mechanism (20) installed, if vibrations or other forces cause the electrical connection at the threaded portion of the electrical conductor (16) and the main lead (12) to become loose, the compressed springs (24) and spring plates (22) will exert opposing forces on the main electrical lead and the electrical conductor (16). These forces will act at the threaded portions (26, 28) to push them together and, thereby, maintain sufficient electrical contact between the main lead (12) and the electrical conductor (16). This force is sufficient so that if the point of electrical contact becomes loose, it will provide sufficient pressure so that the resistance between them does not increase significantly and cause thermal damage to the components. In the most preferred embodiment of this invention, two springs (24) are employed in each of four openings (52). This type of design is used in electrical conductors 784J370G01, 784J375G01 and 784J374G01 designed by Westinghouse Electric Corporation, which has its principal place of business at the Westinghouse Building, Gateway Center in Pittsburgh, Pa. In these designs the springs provide approximately 7,772 lbs. (34.6 kgN) of force. These designs are respectively a modification of the following electrical conductors manufactured by the Emile Haefely & Co., Ltd. of Busel, Switzerland 3-430 192, 3-430 191 and 1-430 193.

In another preferred embodiment of this invention, three springs (24) are used for each screw (34) as opposed to two springs (24). For example, this design is used in Westinghouse Electric Corporation conductors identified as 784J371G01, 784J373G01 and 784J377G01, which are respectively a modification of Haefely conductors 3-430 189, 3-430 190 and 2-430 188. In these designs, the springs provide about 16,772 lbs. (74.6 kgN) of force. In another preferred embodiment, four springs (22) are used at each opening (52). In Westinghouse Electric Corporation design numbered 784J376G01, which is a modification of Haefely conductor 2-430 194, four springs are used per opening, and the springs provide about 4,440 lbs. (19.76 kgN) of force.

As will be appreciated by those skilled in the art, the number of springs (24) stacked together and the orientation of these springs relative to each other can be varied in order to change the magnitude of the force that will be transmitted from the springs (24) to the electrical connection between the components (12, 16).

Because the spring mechanism (20) can be installed by removing the flange (22) from the main lead (12), this method of installation has significant advantages. For example, as will be understood by those skilled in the art, some main leads (12) of electrical generators (10) are not easily accessible to workers. Therefore, any proposed method of providing a preload force that requires overhauling, machining, or the like of the main lead (12) with either the main lead (12) in place or removing the main lead (12) would be more difficult, time consuming, labor intensive and expensive. Since in contrast, the flange (16) can be removed and the spring assembly (20) installed without having to machine or make substantial alterations to the main lead (12), the amount of labor and time spent to complete this installation is comparatively less.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. An electrical generator, comprising:

a main electrical lead that conducts electrical current produced by the generator and that comprises a substantially cylindrical shape that has an external circumference and an end;

an electrical conductor that conducts electrical current produced by the generator and is in electrical contact with the main electrical lead and that comprises a flange shape having an inner face that covers the end of the main electrical lead;

a mechanical connector that electrically connects the electrical conductor to the external circumference of the main electrical lead, wherein the mechanical connector comprises a threaded portion of an interior of the flange and a threaded portion of the external circumference of the main electrical lead that can be mated with the threaded portion of the interior of the flange; and a spring mechanism that exerts a force on the mechanical connector to maintain electrical contact between the conductor and the main electrical lead during operation of the generator and that is disposed between the end of the main electrical lead and the inner face of the conductor.

2. The electrical generator of claim 1, wherein the spring mechanism comprises a compressed spring.

3. The electrical generator of claim 2, wherein the spring mechanism further comprises a pair of spring plates that compress the spring.

4. The electrical generator of claim 2, wherein the spring comprises a conical spring.

5. The electrical generator of claim 1, wherein the spring mechanism comprises a plurality of springs compressed between the flange and the end of the main electrical lead.

6. The electrical generator of claim 1, wherein the end of the main electrical lead comprises an end plug.

7. The electrical generator of claim 6, wherein the spring mechanism further comprises two spring plates compressed between the flange and the end plug.

8. The electrical generator of claim 7, further comprising an insulating material disposed between the end plug and one of the spring plates.

9. A method of preloading an electrical connection between a main electrical lead of an electrical generator and a flanged electrical conductor that transmits electricity produced by the generator to the electrical lead, comprising the steps of:

removing the electrical conductor from the main electrical lead by disconnecting a threaded portion of the conductor from a threaded portion of the main electrical lead;

installing a spring mechanism under pressure to an inner face of the electrical conductor; and mechanically connecting the electrical conductor to the main electrical lead by attaching the threaded portion of the electrical conductor to the threaded portion of the main electrical lead.

10. The method of claim 9, wherein the step of installing the spring mechanism comprises the steps of placing a spring between the electrical conductor and a spring plate.

11. The method of claim 10, wherein the step of installing comprises inserting a screw to mechanically connect the spring mechanism under pressure to the electrical conductor.

12. The method of claim 11, further comprising the step of removing the screw after the step of mechanical connection.

13. An electrical generator, comprising:

a main electrical lead that transmits electricity produced by the generator and that comprises a substantially cylindrically shaped member having an external region that is threaded;

an electrical conductor that is in electrical communication with the main electrical lead and that transmits electricity from the generator, the electrical conductor comprising a flange shape with a hollowed out interior and threads disposed on the circumference of the interior that ate with the threads of the electrical lead, and a spring assembly that is compressed between the flange and the cylindrical member and that exerts a force to compress the threads of the conductor against the threads of the lead.

14. The electrical generator of claim 13, wherein the spring mechanism comprises a spring compressed between spring plates.

15. The electrical generator of claim 14, wherein the spring comprises a conical shape.

16. The electrical generator of claim 14, further comprising an end plug mounted to an end of the cylindrically shaped member.

17. The electrical generator of claim 16, further comprising an insulator disposed between the end plug and one of the spring plates.

* * * * *